United States Patent [19]

Ribadeau-Dumas et al.

[11] Patent Number: 5,900,261
[45] Date of Patent: * May 4, 1999

[54] SUGAR-FREE COATING OBTAINED BY HARD COATING AND PROCESS FOR PRODUCING IT

[75] Inventors: Guillaume Ribadeau-Dumas, Lambersart; Michel Serpelloni, Beuvry les Bethune, both of France

[73] Assignee: Roquette Freres, Lestrem, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,168

[22] Filed: Oct. 29, 1996

[30] Foreign Application Priority Data

Oct. 30, 1995 [FR] France .................................. 95 12773

[51] Int. Cl.$^6$ ...................................................... A23G 3/30
[52] U.S. Cl. ................................................................ 426/5
[58] Field of Search .............................................. 426/3, 5

[56] References Cited

U.S. PATENT DOCUMENTS

| | | |
|---|---|---|
| 4,127,677 | 11/1978 | Fronczkowski et al. . |
| 4,317,838 | 3/1982 | Cherukuri et al. . |
| 4,681,766 | 7/1987 | Huzinec et al. . |
| 4,786,511 | 11/1988 | Huzinec et al. . |
| 4,792,453 | 12/1988 | Reed et al. . |
| 4,840,797 | 6/1989 | Boursier . |
| 5,248,508 | 9/1993 | Reed et al. . |
| 5,270,061 | 12/1993 | Reed et al. . |
| 5,376,389 | 12/1994 | Reed et al. . |
| 5,478,593 | 12/1995 | Serpelloni et al. . |
| 5,571,547 | 11/1996 | Serpelloni et al. ..................... 426/103 |
| 5,629,042 | 5/1997 | Serpelloni et al. ..................... 426/660 |

FOREIGN PATENT DOCUMENTS

| | | |
|---|---|---|
| 0 037 407 | 10/1981 | European Pat. Off. . |
| 0 228 999 | 7/1987 | European Pat. Off. . |
| 0 229 594 | 7/1987 | European Pat. Off. . |
| 0 272 220 | 6/1988 | European Pat. Off. . |
| 0 273 000 | 6/1988 | European Pat. Off. . |
| 0308 317 | 3/1989 | European Pat. Off. . |
| 0 415 656 | 3/1991 | European Pat. Off. . |
| 0 314 739 | 1/1994 | European Pat. Off. ......... A23G 3/30 |
| 2 342 668 | 9/1977 | France . |
| 61-263915 | 11/1986 | Japan . |
| WO 93/18663 | 9/1993 | WIPO . |
| WO 95 07621 | 3/1995 | WIPO . |
| WO 95/07622 | 3/1995 | WIPO . |

OTHER PUBLICATIONS

"Sugarless panning procedures and techniques" The Manufacturing Confectioner, 1992 — pp. 77–82 (F. Boutin).

"Food technological evaluation of xylitol" by F. Voirol, Advances in Food Research, 1982, vol. 28, pp. 373–403.

"Coating with sorbitol, a comparison of properties of sorbitol–mannitol, other polyols and sucrose" Manufacturing Confectioner, 1980, vol. 60 p. 26, (F. Devos).

Conference by G. Ribadeau–Dumas "Actual manufacturing possibilities for sugarless hard and soft coating : techniques — problems — solutions" in Süsswaren–Dragee–Tagung, May 1994, Solingen,Zentral–fachshule der Deutschen Süsswarenwirtschaft e. V.

Primary Examiner—Lynette F. Smith
Assistant Examiner—Brenda G. Brumback
Attorney, Agent, or Firm—Larson & Taylor

[57] ABSTRACT

The invention relates to a new hard crystalline coating based on a specific mixture of polyols. It exhibits, in particular, the characteristic of having an improved crunchiness compared with the coatings known in the prior art. The subject of the invention is also a process for producing this specific coating and an improved process for hard coating based on xylitol, maltitol or lactitol or mixtures thereof.

24 Claims, No Drawings

SUGAR-FREE COATING OBTAINED BY HARD COATING AND PROCESS FOR PRODUCING IT

The subject of the invention is a new crystalline coating based on a specific mixture of polyols.

It also relates to the process for producing this coating by hard coating.

Hard coating is a unit operation used in a good number of fields among which are confectionery and pharmacy. It may also relate to the industry for additives such as flavours, sweeteners, vitamins, enzymes, acids and products based on plants. This operation consists in creating a hard crystalline coating at the surface of solid or pulverulent products in order to protect them for various reasons or in order to make them attractive visually or tastewise. Most generally, this unit operation is carried out by placing such products, as cores or centres to be coated, in a coating pan.

Hard coating aims to obtain a crunchy and sweet layer which is always well liked in the case of confectionery or chewing gum. It always requires the use of a syrup and/or of a suspension containing crystallizable materials. The hard and crystalline coating is obtained, in this case, by applying this syrup or this suspension over the cores or centres and evaporating the water brought by these by means of drying with hot and dry air, which causes the crystallization. This cycle should be repeated a very large number of times, of the order of ten to eighty times, in order to obtain the desired degree of size increase. Degree of size increase commonly refers to the increase in the weight of the products, considered at the end of the operation in relation to the beginning, expressed in terms of the final weight of the products.

The hard coating may be preceded or followed by other coating techniques. The following techniques, which are often carried out, also using a coating pan, may be selected in particular:

gumming, which is a technique in which syrups of noncrystallizable and, in general, nonhygroscopic materials such as gum arabic, modified starches and celluloses, and maltodextrins are used. This technique makes it possible, after one or two applications of the gumming syrup over the product to be coated, to create a vitreous film which acts as a barrier to the migration of oxygen, water or fat. In this process, powders of various types may also be used together with these noncrystallizable syrups so as to fix the water brought by the syrups. In yet other cases, sugars or polyols which are melted or which are liquefied by solvents are used. The hard and brittle vitreous coating is then obtained by cooling or by evaporation of the solvents.

soft coating, which consists in creating a very flexible and soft coating at the surface of the products. This coating is obtained by repeated applications of, on the one hand, a noncrystallizable syrup such as, in general, starch hydrolysates, and, on the other hand, a powder, in general, crystallized sucrose. The coating is usually thick. The degree of size increase for this technique is of the order of 10 to 80% or even more. It should be noted that the constituent material of the syrup is usually different from that of the powder.

polishing, which consists, through the use of fatty substances or of waxes generally brought in crystallized form as flakes or in the form of alcoholic solutions, in coating the products with a very thin fatty film so as to reduce water transfers from or to the coated products but also to make their surface nice.

The term hard coating used in the present invention also comprises the very similar techniques which are smoothing and frosting.

Smoothing consists of one or two applications or loadings of a crystallizable syrup which is diluted compared with that used in hard coating. The aim is often to perfect the surface appearance of coated products.

Frosting, for its part, also aims to improve the appearance of the products, but also to isolate the latter from the moisture in the atmosphere. This technique resembles hard coating in that a crystallizable syrup is used. The essential difference lies in the fact that the number of cycles carried out is only one, two or three.

Hard coating proper, smoothing, frosting as well as combinations of these techniques are therefore of interest within the framework of the present invention. Hard coating is often followed by smoothing.

Several of these coating processes have been applied using polyols.

Polyols are normally understood, as in the present invention, to mean the sugar alcohols obtained by the reduction of sugars. More specifically, within the framework of the invention, mannitol is of interest.

There is also interest in the following specific polyols: xylitol, maltitol and lactitol.

Finally, there is interest in glucose 1-6 mannitol (or alpha-D-glucopyranosyl-1-6-mannitol) and in mixtures of polyols containing this molecule, such as isomalt.

Polyols, whose sweetness is generally inferior to that attributed to sucrose which they tend to replace in human foods but also in pharmaceutical and dietetic formulations, have the advantage of not being cariogenic and of having a calorific value which is fixed in Europe at two-thirds that of sugar.

Among the polyols, only sorbitol is so far marketed in the form of highly pure syrups which can be used directly in hard coating, especially according to the process which is the subject of patent EP 037,407.

As regards xylitol, maltitol and lactitol which are of particular interest within the framework of the present invention, it is customary, in order to carry out hard coating, to dissolve beforehand at high temperature one of these polyols in water so as to prepare crystallizable solutions in this way. It has always been considered essential to use, by analogy with what is done for sucrose, powders of very high purity so as to allow a rapid and easy crystallization of the polyol selected from the solution or suspension used in hard coating. This obligation is recalled for example in the article by F. BOUTIN "Sugarless panning procedures and techniques" The Manufacturing Confectioner, 1992, 77–82. It is stated that the rate of crystallization depends directly on the purity of the polyol syrup used. The author refers to sucrose for which it has been observed that this rate is reduced by half when its purity is only 95%, relative to pure solutions.

As regards hard coating with xylitol, besides this article, the need to select xylitol of high purity is mentioned directly or indirectly in the following documents:

Patent FR 2,342,668 from the company FERRERO, where it is also stated that it is imperative to use xylitol containing at most 5% of other polyols such as sorbitol and/or mannitol, U.S. Pat. No. 4,127,677 in the name of the company LIFE SAVERS where it is recommended to use a solution, containing on a dry basis from 95 to 99.5% xylitol, obtained by dissolving crystalline xylitol at low temperature and then heating the mixture, the document "FOOD TECHNOLOGICAL EVALUATION OF XYLITOL" by F. VOIROL, ADVANCES in FOOD RESEARCH, 1982, vol 28, 373–403, where it is stated simply that it is advantageous to prepare a solution supersaturated with xylitol at 85% dry matter content, Patent EP 273,000 from the WARNER-LAMBERT Company in which there is described an edible product covered with a coating composed of 40 to 70% xylitol, the balance to 100% being made up of at least one film-forming agent, at least one binder and at least one filling agent of inorganic nature and optionally at least one plasticizer. This patent also claims a coating process consisting in the successive use of three coating syrups always containing, relative to their dry matter content, less than 35% of a sugar or of a polyol such as in particular xylitol, and U.S. Pat. No. 4,681,766 and U.S. Pat. No. 4,786,511 also held by the WARNER-LAMBERT Company, in which there are described a hard coating solution and a coating covering both containing 30 to 80% of a sweetener, preferably xylitol, 1 to 15% of gum arabic and 0.05 to 10% of a calcium salt.

Several documents also refer to the possibility of carrying out a hard coating using maltitol, since the purity of this polyol is very high. This is the case in particular for:

Patent EP 201,412, held by the applicant, where there are described both a coating process using a maltitol syrup of a purity exceeding 92% and a product having a hard crystalline coating containing at least 90% maltitol, and Patent Application JP 61,263915 in the name of the company HAYASHIBARA, relating to the use, in hard coating, of a syrup containing maltitol of a purity greater than 90% and a cohesion agent.

As regards coating with isomalt, U.S. Pat. Nos. 4,792,453 and 5,248,508 from the company WRIGLEY are also known where, as polyol, only isomalt is dissolved in water in order to prepare the coating solutions.

Hard coating with lactitol is also known. In this case as well, it seems that it has so far still never been envisaged to use it other than as sole pure polyol.

In the case of mannitol, although the possibility of carrying out a hard coating with mannitol is mentioned in application EP 308,317 filed by the company SANOFI without, however, giving concretely the conditions for such an operation, it appears very difficult to achieve this. This is confirmed by the document by F. DEVOS "Coating with sorbitol, a comparison of properties of sorbitol-mannitol, other polyols and sucrose" in The Manufacturing Confectioner, 1980, vol. 60 p. 26, where the author explains that the solubility of mannitol is too low to allow good conditions for hard coating and that too much water would then have to be evaporated. This explains why a priori there has never been on the market a product coated with mannitol.

In conclusion, a commonly prevalent postulate exists according to which it is advisable to select a single pure polyol in order to rapidly and satisfactorily carry out a hard coating with polyols.

This is not in contradiction with the basic principles of the two most recent hard coating techniques known which are described below, quite the contrary.

The first of these two new techniques, which is described especially in Patents and patent applications U.S. Pat. No. 5,270,061; WO 93/18663, WO 95/07621 and WO 95/07622 by the company WRIGLEY, consists of a "dual" or "double" coating. The aim is to start the coating with a syrup containing a pure polyol such as xylitol, maltitol or lactitol and then to continue it and to finish it using another syrup of polyol which is also pure but different in nature from the first polyol, such as isomalt. This double coating technique essentially aims to reduce the cost of the coating by partial substitution of one polyol by another and to reduce the hygroscopicity of the coated layer. It however appears to be very costly timewise and difficult to implement industrially.

The second recent technique is disclosed in Patent Application EP 625,311 held by the applicant. It is claimed therein to apply successively one polyol syrup of high purity and a powder containing the same polyol in the pure state and not to proceed, as is usually done, to forced drying with dry and hot air in the coating pan. This process makes it possible to reduce very substantially the coating times and to obtain relatively crunchy coatings after storing for a few hours.

Besides the search for means aimed at reducing the costs of hard coating with polyols and especially for reducing the coating times, solutions have often been sought which are aimed at increasing the crunchiness and crispness of the sugar-coating coatings with polyols. These factors, as well as the taste, act directly on the acceptance of the products and on the repeat purchase by consumers.

As mentioned by G.RIBADEAU DUMAS in his conference entitled "Actual manufacturing possibilities for sugar-less hard and soft coating: techniques-problems-solutions" in Süβwaren-Dragee-Tagung, May 1994, Solingen, Zentralfachshule der Deutschen Süβwarenwirtschaft e.V., crunchiness is a subjective and complex organoleptic parameter which can, however, be assessed by mechanical measurements of hardness and brittleness with the aid of an INSTRON type apparatus. It was thus possible for him to demonstrate objectively that the crunchiness varies with the characteristics of the core or centre to be coated just as with those of the coated layer. The nature of the polyol selected to prepare the coated layers, the water content of the coated layers at the end of the coating as well as the water activity are described as factors which act directly on the crunchy character.

Unfortunately, however, replacing one polyol with another in order to obtain an enhanced crunchiness is not without effect on the other essential organoleptic characteristics of the coated layer such as the sweetness, whiteness or freshness in the mouth, such that it is generally incompatible with the wishes of consumers. Accordingly, the author of the abovementioned conference advises, when the crunchiness is inadequate, selecting a purer polyol rather than substituting one polyol by another.

As regards adjusting the characteristics of the core or centre to be coated, possibilities for improvement exist but are generally very limited.

Finally, reducing the residual water content of the coated layers in order to increase the crunchiness is in general always possible but is invariably accompanied by an increase in manufacturing time and energy-related expenditure, which is particularly inconvenient.

Other solutions appear to have also been proposed for improving, in particular, the crunchiness of the sugar-free hard coated layers based on polyols.

It has very often been recommended to incorporate into the coating syrups substances other than polyols. This is the case, for example, in Patent EP 229,594 by the company WARNER-LAMBERT, it is recommended to combine polyvinylpyrrolidone with the polyol selected.

Other authors have proposed using, besides gelatin and gum arabic whose use in coating dates back a very long way, binders such as modified celluloses, glucose syrups, pullulan or various gums, in relatively low amounts, generally of less than 5% on a dry basis. It has been observed that these substances improve the adhesion of the coated layer to the core or centre as well as the cohesion of the coated layer. They also act to a certain extent on the crunchiness. However, it appears that the addition of such viscous substances significantly disrupts the crystallization of the polyol used, such that the coated layer has a lower crystallinity. This would explain its tendency to become sticky in this case. Furthermore, these substances do not make it possible to reduce the coating times, quite the contrary.

The applicant has observed, surprisingly and unexpectedly, that the addition of mannitol to the coating syrups or suspensions based on xylitol, maltitol or lactitol, in an amount of 20 to 50% on a dry basis relative to the dry polyols present, makes it possible both to reduce the coating times and to increase the crunchiness of the coatings thus obtained. Against all expectations, the applicant realized that mannitol, as an impurity which is deliberately introduced, far from delaying the crystallization of the xylitol, maltitol or lactitol, has, on the contrary, a pro-crystallizing effect at some very specific concentrations, that is to say that it accelerates the crystallization of these polyols from saturated or supersaturated aqueous media such as hard coating syrups. Furthermore, when it is incorporated in a sufficient amount, that is to say at more than 20%, a very notable effect is observed for the crunchiness and crispness of the coated layer. On the other hand, above 50%, the applicant observed that the mannitol loses its beneficial effect on the crunchiness and that, furthermore, the times necessary for coating tend to increase again.

Pursuing its research work, the applicant established that the pro-crystallizing role and the role of crunchiness-enhancing agent discovered for mannitol could also be played by glucose 1-6 mannitol. In this case, an addition rate of 5 to 50% on a dry basis relative to the dry matter content consisting of the polyols present in the coating syrup, should be used.

The applicant also established that it is possible to use a mixture of polyols containing mannitol and/or glucose 1-6 mannitol, provided that the amounts used are adjusted, which does not pose a specific problem.

Accordingly, in the final analysis, the commonly prevalent postulate that coated layers of excellent crunchiness can only be obtained rapidly by using a polyol of very high purity, while remaining valid overall, is not true when mannitol or glucose 1-6 mannitol is brought as impurity in a very specific quantity.

The invention therefore relates, firstly, to a new hard crystalline coating containing at least 90% of a polyol mixture consisting, on a dry basis, of about 20 to 50% mannitol or about 5 to 50% glucose 1-6 mannitol, the balance for 100% of the dry matter content of the mixture consisting essentially of a polyol chosen from xylitol, maltitol or lactitol.

The crystalline coating according to the invention may contain pure mannitol or glucose 1-6 mannitol crystals intimately mixed with pure xylitol, maltitol or lactitol crystals. Such a coating may be obtained for example by crystallizing at the surface of a core or centre a syrup containing, in a dissolved state, xylitol, maltitol or lactitol and, in the crystallized state, mannitol, glucose 1-6 mannitol or any substance containing either of these two polyols.

The crystalline coating according to the invention may also consist of co-crystals composed, on the one hand, of mannitol or glucose 1-6 mannitol and, on the other hand, of xylitol, maltitol or lactitol. Co-crystals is understood to mean crystals obtained by crystallizing together, from a supersaturated solution, on the one hand, maltitol, xylitol or lactitol and, on the other hand, mannitol or glucose 1-6 mannitol.

Advantageously, the polyol mixture constitutes more than 95% of the coating in accordance with the invention and, better still, more than 98% thereof. The latter may, consequently, also comprise other substances. There may be mentioned, without the list being exhaustive, substances such as flavours, intense sweeteners, colourings, whitening agents such as talc or titanium dioxide, inorganic filling agents, binders such as for example gelatin and gum arabic, fat, waxes or lacquers, and also water. Generally, the water content is less than 1.5%, preferably less than 1.0% and better still less than 0.5%.

This coating may be made using a very wide variety of products as core or centre to be coated. These may be food products such as for example confectionery such as chewing gums, tablets, lozenges, jellies, liqueur-filled eggs, chewy pastes, hard sweets, chocolate products, but also pharmaceutical or veterinary products such as pills, tablets, products for animals, dietetic products, plant granules, other products such as seeds, dry fruits, grains, agglomerated fertilizer powders or alternatively additives based on enzymes or microorganisms intended, in particular for the manufacture of food products such as bread or of industrial products such as detergents or other detergent or washing powders, pulverulent additives composed of vitamins, flavourings, perfumes, acids, sweeteners or various active ingredients.

According to a first embodiment, the crystalline coating according to the invention comprises mannitol and another polyol chosen from xylitol, maltitol and lactitol. Preferably, according to this embodiment, only one of these three polyols is combined with mannitol. Advantageously, the latter represents, on a dry basis, 20 to 40% of the dry matter content of the mixture which constitutes the coating, and better still 22 to 35% thereof. It has indeed been observed that the results in terms of crunchiness and rate of coating are best for these values. The use of mannitol of a purity greater than 95%, and better still greater than 98%, is also preferred.

According to a second embodiment, the crystalline coating according to the invention comprises glucose 1-6 mannitol and another polyol chosen from xylitol, maltitol and lactitol. Preferably, the glucose 1-6 mannitol is combined with only one of these three polyols. Advantageously, according to this specific embodiment, the glucose 1-6 mannitol represents, on a dry basis, 10 to 40%, and better still 15 to 35% of the dry matter content of the polyol mixture which constitutes the coating. These values are particularly suitable when the glucose 1-6 mannitol is of a high purity, that is to say greater than 75% and preferably greater than 90%. When this purity decreases and no longer reaches more than about 50%, as in the case of the use of the product called isomalt, the preferred contents are lower and are between 5 and 20% and better still between 5 and 15%. Starting with these considerations, a few simple routine tests are sufficient to determine the glucose 1-6 mannitol content to be used depending on its degree of purity in order to obtain the best results in terms of crunchiness and rate of coating.

The crystalline coating according to the invention may, because of its high crunchiness, constitute an inner, intermediate or outer coating of complex coatings such as those prepared by double coating or such as those composed of several coated layers of different nature or texture.

The invention relates, secondly, to a process for producing, by hard coating, a hard crystalline coating having the characteristics defined above.

The hard coating process according to the invention comprises the following steps in its general mode:

rotating the cores or centres to be coated in a coating pan;

creating, at the surface of the cores or centres, a semicrystalline coating containing, on a dry basis, at least 90% of a polyol mixture brought by repeated applications of at least one crystallizable liquid composition or alternatively of at least one crystallizable liquid composition and of at least one crystallized composition; the polyol mixture consisting, on a dry basis, of about 20 to 50% mannitol or of about 5 to 50% glucose 1-6 mannitol, the balance for 100% of the dry matter content consisting essentially of a polyol chosen from xylitol, maltitol or lactitol;

preferably, drying the coating in or outside the coating pan in order to allow more complete crystallization of the mannitol or glucose 1-6 mannitol and of at least one of the additional polyols.

As regards the first step of the process, the cores or centres to be coated are subjected to panning, that is to say a rotational movement in a coating pan. The latter may have an ordinary shape, that is to say a tulip shape with an inclined axis of rotation or alternatively a cylindrical shape with a horizontal axis. The cores or centres, preferably freed of dust prior or subsequent to their introduction into the pan, preferably have a spherical, cylindrical or oval shape so as to facilitate the coating operation, but they equally well have a cushion shape.

The second step consists in creating at the surface of the cores or centres a semicrystalline coating composed of a mixture of specific polyols.

According to a first embodiment, only crystallizable liquid compositions are applied to the surface of the cores or centres. These may be, in particular, the following compositions:

a solution containing in the dissolved state both mannitol or glucose 1-6 mannitol and at least one other polyol chosen from xylitol, maltitol and lactitol. Preferably, these solutions have a xylitol, maltitol or lactitol saturation level of between 0.8 and 1.2, or, a suspension containing in the dissolved state and in the crystallized state both mannitol and glucose 1-6 mannitol and at least one other polyol chosen from xylitol, maltitol and lactitol.

These compositions are necessarily crystallizable, that is to say capable of causing, upon evaporation of water, the crystallization of mannitol or glucose 1-6 mannitol and of at least one of the additional polyols. According to this embodiment, an appropriate quantity of crystallizable liquid composition is sprayed onto the surface of the cores or centres, this quantity is allowed to become distributed so as to obtain, at the surface of the cores or centres, a thin film of crystallizable liquid composition and, preferably, drying is carried out by blowing dry and hot air into the pan, so as to allow the crystallization. This cycle may, as in the case of a conventional coating, be repeated a large number of times so as to obtain the desired degree of size increase.

According to a second embodiment, at least one of the crystallizable liquid compositions defined above, but also at least one crystallized composition, are applied to the surface of the cores or centres.

Crystallized composition is understood to mean any pulverulent composition containing, in the crystallized state, at least one of the polyols chosen from mannitol, glucose 1-6 mannitol, xylitol, maltitol and lactitol.

According to this second embodiment, there are applied to the surface of the cores or centres to be coated, on the one hand, a crystallizable liquid composition and, on the other hand, after distribution of the latter, a crystallized composition. The polyols constituting these two types of compositions are chosen so that the coating contains at least 90% of a mixture of polyols consisting, on a dry basis, of about 20 to 50% mannitol or about 5 to 50% glucose 1-6 mannitol, the balance for 100% of this dry matter content being essentially a polyol chosen from xylitol, maltitol and lactitol.

The last step, which is optional but desirable, of the process in accordance with the invention consists in drying. It may be carried out inside the coating pan by blowing dry and hot air or outside the latter for example by placing cores or centres coated with the semicrystalline mixture in a drying chamber. This step is aimed at allowing a more complete crystallization, on the one hand, of the mannitol or glucose 1-6 mannitol and, on the other hand, of the additional polyol chosen from xylitol, maltitol and lactitol. Instead of carrying out this step, it is also possible to leave the semicrystalline coating to develop naturally into a crystalline state.

The applicant observed that the crunchiness and crispiness obtained depend both on the level of crystallinity of the coating and on its water content.

Using organoleptic tests, but also using measurements of hardness and brittleness with the aid of an apparatus of the INSTRON model 4502 brand, the applicant observed that the crunchiness of the coating containing mannitol or glucose 1-6 mannitol crystals and crystals of at least one additional polyol chosen from xylitol, maltitol and lactitol, is considerably higher than the crunchiness of control coatings according to the prior art, consisting of only the same additional polyol.

Using comparative thermodynamic measurements between coatings according to the invention and prior art coatings, it is nevertheless observed, contrary to what would be suggested by the results obtained from organoleptic and Theological studies, that the heats of fusion of the coatings according to the invention are lower than those of the control coatings of the prior art. Indeed, these values are normally 5 to 25% lower. By way of example, all other factors being equal, the heat of fusion of a coating according to the invention composed of xylitol and mannitol in the respective proportions, on a dry basis, of 78% and 22% relative to all the polyols present, is only 170 J/g, whereas the enthalpy of a prior art coating solely consisting of xylitol is close to 215 J/g. The melting point of the coating is normally also reduced. In the above example, the melting point of the prior art coating is close to 93° C. whereas it is only about 87° C. for the coating according to the invention.

As for the water content, it is preferable, by virtue of the final drying, that it is reduced to a value of less than 1.5%, preferably of less than 1.0%, and more preferably of less than 0.5%.

The applicant company observed that the process in accordance with the invention makes it possible to obtain more rapidly the desired degree of size increase, compared with the prior art processes of the same type using, as sole polyol, xylitol, maltitol or lactitol. The applicant also observed a reduced formation of dust in the coating pan and in the coating area when crystallizable liquid compositions alone are used, which is particularly advantageous compared with the prior art.

Thirdly, the invention relates to a process which improves the rate of coating and the crunchiness of coatings obtained by hard coating with the aid of a polyol chosen from xylitol, maltitol, lactitol and mixtures thereof consisting in substituting:

by mannitol 20 to 50%, preferably 20 to 40%, and more preferably 22 to 35% of the chosen polyol, or by glucose 1-6 mannitol 50 to 50%, preferably 10 to 40%, and more preferably 15 to 35% of the chosen polyol.

The invention also relates to the use of mannitol or glucose 1-6 mannitol for this purpose and in the quantities specified above. The gains made in terms of rate of coating and of crunchiness relative to the prior art are normally at least 10%.

The means for carrying out this process, as well as the advantageous characteristics of the new coating in accordance with the invention will be understood better in the light of the examples which follow, with no limitation being implied.

EXAMPLE 1

Preliminary Tests

These tests are reported in order to demonstrate the specific roles of maltitol and glucose 1-6 mannitol on the crystallization of xylitol, mannitol and lactitol, compared with other polyols.

For that, solutions at 75% dry matter content are prepared containing:

only xylitol, xylitol/other polyol mixtures in the respective ratios (on a dry basis) of 95%/5%, 90%/10% and 78%/22%.

As other polyol, the following products of very high purity are selected:

sorbitol, arabitol, mannitol, maltitol, pure glucose 1-6 mannitol obtained by fractional crystallization of isomalt.

The solutions are prepared according to the following standardized procedure:

solubilization at 60° C., adjustment of the dry matter content, maintenance in a closed jar on a water bath at 100° C. for 1 hour.

All the solutions (16 in total) are then placed at 20° C. for 13 days.

It is observed that during this period, only four preparations progressed towards a crystallization of xylitol. They are the solutions containing, on a dry basis:

90% xylitol and 10% mannitol,

90% xylitol and 10% glucose 1-6 mannitol,

78% xylitol and 22% mannitol,

78% xylitol and 22% glucose 1-6 mannitol.

The solutions containing 22% glucose 1-6 mannitol or 22% mannitol crystallized after only 2 days, the other two solutions progressed in the same manner but after 5 days with mannitol, and after 7 days with glucose 1-6 mannitol.

All the preparations unchanged after 13 days at 20° C. (12 in total) are subjected to several heat cycles comprising a 12-hour phase at 4° C. and a 12-hour phase at 20° C.

It is observed that the solution of pure xylitol crystallizes after only one cycle. Given the water-solubility of xylitol which is 62.7% at 20° C., it can be noted that the initial solution remained unchanged in the supersaturated state for 13 days and that only a decrease in temperature to 4° C. was enough to cause crystallization of the xylitol.

After 4 cycles of 12 hours at 4° C. and of 12 hours at 20° C., crystals of xylitol are found to appear in the solution composed, on a dry basis, of 95% xylitol and 5% glucose 1-6 mannitol.

All the other solutions (10 in total) remained unchanged compared with the initial state, even after 7 heat cycles.

It can be deduced from these tests that, surprisingly, mannitol and glucose 1-6 mannitol accelerate the crystallization of xylitol from a supersaturated solution but on the condition that they are used at a sufficient concentration (greater than 10%). Indeed, these same two polyols have the opposite effect at low concentration. The pro-crystallizing effect of mannitol and glucose 1-6 mannitol at some concentrations can be used to accelerate the rate of hard coating in the case of xylitol.

It is observed that the other polyols used (sorbitol, maltitol and arabitol) only slow down the crystallization of xylitol and are, as a result, true anti-crystallizing agents for xylitol.

The pro-crystallizing effect of mannitol and glucose 1-6 mannitol at some concentrations also exists on maltitol and on lactitol as was verified by the applicant by other tests of the same type.

By way of example, the applicant observed the pro-crystallizing effect of mannitol on maltitol on a preparation at 70% dry matter content containing 70% maltitol and 30% mannitol respectively.

EXAMPLE II

Preparation of Coatings According to the Invention and According to the Prior Art 2.1) Preparation:

Cushion-shaped chewing gum cores or centres are coated using polyol compositions all having a dry matter content of 75% and all containing, on a dry basis, 98.7% polyols and 1.3% gum arabic.

For that, four different compositions are used:

syrup A: this contains only xylitol as polyol; it is a syrup according to the prior art, syrup B which contains, as polyol, 90% xylitol and 10% mannitol, syrup $I_1$ which contains, as polyol, 79% xylitol and 21% mannitol, and syrup $I_2$ which contains, as polyol, 75% xylitol and 25% mannitol.

To avoid their possible crystallization, the four syrups are maintained at a temperature of 70° C.

Four hard coating trials are carried out using each of the four syrups during the entire duration of the coating. For that, 1 kg of cores or centres is placed in a tulip-shaped coating pan.

Each of the compositions is sprayed on the rotating cores or centres in an amount of 10 ml. After distribution of this quantity, the cores or centres are dried by ventilation with dry and hot air.

Once this cycle is completed, another one is started in an identical manner but gradually increasing the quantities applied, until degrees of size increase of 20% are obtained. Half the coated products is then removed from the pan. The coating is continued for the other half until a degree of size increase of 30% is obtained.

It is observed that to achieve the same degree of size increase, the coating time is shorter with the syrups containing mannitol, and all the more so the higher the quantity of mannitol. A smaller formation of dust is also observed with syrups $I_1$ and $I_2$ than with syrups A and B.

2.2) Organoleptic quality of the coatings obtained

The four types of coatings obtained are submitted to a panel of experts in order to score the crunchiness (0: very poor crunchiness and 5: very good crunchiness).

The highest scores, for the same degree of size increase, are obtained for the crystalline hard coatings prepared using syrups $I_1$ and $I_2$.

2.3) Comparative measurements of the hardness and brittleness of coatings according to the invention and according to the prior art.

The hardness and the brittleness of a coating according to the invention (syrup $I_1$) and of a coating according to the prior art (syrup A) as obtained above, with a degree of size increase of 20% and of 30%, are studied with the aid of an INSTRON model 4502 type equipment. These coatings contain 0.7% water.

The hardness thus measured corresponds to the force necessary to obtain the first break in the coating, expressed in terms of the distance of penetration of the punch used. The brittleness corresponds, for its part, to the number of breaks obtained in the coating for a given penetration of the punch used.

These two values make it possible to calculate an INSTRON crunchiness value which can be directly correlated with the crunchiness results obtained by a panel of experts.

|  | Degree of size increase | | | |
|---|---|---|---|---|
|  | 20% | | 30% | |
|  | Syrup $I_1$ | Syrup A | Syrup $I_1$ | Syrup A |
| Hardness (N/mm) | 56 | 65 | 72 | 86 |
| Brittleness | 8 | 5 | 11 | 8 |
| INSTRON crunchiness | 2.5 | 2.1 | 3.4 | 3.1 |

It is observed that the coatings according to the invention, although significantly less hard, are very clearly more brittle and more crunchy.

2.4) Thermodynamic study

The coatings according to the invention, obtained using syrups $I_1$ and $I_2$, have melting points of between 82 and 89° C. whereas the melting point of the coating according to the invention is about 93° C.

It should be noted that only one melting peak is detected for the coatings in accordance with the invention, as obtained above, although they contain both xylitol and mannitol.

The enthalpy measured for the coatings according to the invention is between 160 and 180 J/g whereas it is about 215 J/g for the coating according to the prior art.

2.5) Observations under an electron microscope

It is observed that at least some regions of the coatings according to the invention contain two populations of crystals. Some of them, not many, of elongated and parallelepipedal shape resemble ordinary mannitol crystals; the others, more compact in shape and less elongated, are similar to ordinary xylitol crystals.

EXAMPLE III

Preparation of Coatings According to the Invention and According to the Prior Art 3.1) Preparation:

Cushion-shaped chewing gum cores or centres are coated using polyol compositions all having a dry matter content of 75% and all containing, on a dry basis, 98.7% polyols and 1.3% gum arabic.

For that, two different compositions are used:

syrup A: this contains only xylitol as polyol; it is a syrup according to the prior art, syrup $I_3$ which contains, as polyols, 75% xylitol and 25% mannitol.

To avoid their possible crystallization, the two syrups are maintained at a temperature of 70° C.

Two hard coating trials are carried out using each of the two syrups during the entire duration of the coating. For that, 3 kg of cores or centres are placed in a tulip-shaped coating pan.

Each of the compositions is sprayed on the rotating cores or centres in an amount of 30 ml. After distribution of this quantity, the cores or centres are dried by ventilation with dry and hot air.

Once this cycle is completed, another one is started in an identical manner but gradually increasing the quantities applied, until degrees of size increase of 20% are obtained.

3.2) Quality of the chewing gums obtained and advantages of the process:

The time required to coat the chewing gum cores or centres is shorter when the syrup $I_3$ according to the invention is used, compared with the syrup A according to the prior art.

The chewing gums obtained according to the invention had an excellent crunchiness score during tasting by the panel of experts.

Moreover, thermodynamic analysis of this crystalline coating according to the invention has shown that it has a melting point of 84.5° C. and a heat of fusion of 146 J/g.

EXAMPLE IV

Preparation of Coatings According to the Invention and According to the Prior Art 4.1) Preparation:

Cushion-shaped chewing gum cores or centres are coated using polyol compositions all having a dry matter content of 75% and all containing, on a dry basis, 98.7% polyols and 1.3% gum arabic.

For that, two different compositions are used:

syrup A: this contains only xylitol as polyol; it is a syrup according to the prior art, syrup $I_4$ which contains, as polyols, 78% xylitol and 22% glucose 1-6 mannitol.

To avoid their possible crystallization, the syrup according to the prior art is maintained at a temperature of 70° C., whereas the syrup $I_4$ according to the invention is only maintained at a temperature of 50° C.

Two hard coating trials are carried out using each of the two syrups during the entire duration of the coating. For that, 3 kg of cores or centres are placed in a tulip-shaped coating pan.

Each of the compositions is sprayed on the rotating cores or centres in an amount of 30 ml. After distribution of this quantity, the cores or centres are dried by ventilation with dry and hot air.

Once this cycle is completed, another one is started in an identical manner but gradually increasing the quantities applied, until degrees of size increase of 20% are obtained.

4.2) Quality of the chewing gums obtained and advantages of the process:

The time required to coat the chewing gum cores or centres is shorter when the syrup $I_4$ according to the invention is used, compared with the syrup A according to the prior art.

Moreover, maintaining the syrup $I_4$ according to the invention at the temperature of 50° C. was sufficient to prevent its crystallization. This constitutes a significant economic advantage which will be appreciated by persons skilled in the art.

The chewing gums obtained according to the invention had an excellent crunchiness score during tasting by the panel of experts.

Moreover, thermodynamic analysis of this crystalline coating according to the invention has shown that it has a heat of fusion of 170 J/g.

EXAMPLE V

Preparation of Coatings According to the Invention and According to the Prior Art 5.1) Preparation:

Cushion-shaped chewing gum cores or centres are coated using polyol compositions all having a dry matter content of 75% and all containing, on a dry basis, 98.7% polyols and 1.3% gum arabic.

For that, two different compositions are used:

syrup A: this contains only maltitol as polyol; it is a syrup according to the prior art, syrup $I_5$ which contains, as polyols, 50% maltitol and 50% glucose 1-6 mannitol.

To avoid their possible crystallization, the syrup according to the prior art is maintained at a temperature of 70° C., whereas the syrup $I_5$ according to the invention is only maintained at a temperature of 50° C.

Two hard coating trials are carried out using each of the two syrups during the entire duration of the coating. For that, 3 kg of cores or centres are placed in a tulip-shaped coating pan.

Each of the compositions is sprayed on the rotating cores or centres in an amount of 30 ml. After distribution of this quantity, the cores or centres are dried by ventilation with dry and hot air.

Once this cycle is completed, another one is started in an identical manner but gradually increasing the quantities applied, until degrees of size increase of 20% are obtained.

5.2) Quality of the chewing gums obtained and advantages of the process:

The time required to coat the chewing gum cores or centres is shorter when the syrup $I_5$ according to the invention is used, compared with the syrup A according to the prior art.

Moreover, maintaining the syrup $I_5$ according to the invention at the temperature of 50° C. was sufficient to prevent its crystallization. This constitutes a significant economic advantage which will be appreciated by persons skilled in the art.

The chewing gums obtained according to the invention had an excellent crunchiness score during tasting by the panel of experts.

Moreover, thermodynamic analysis of this crystalline coating according to the invention has shown that it has a heat of fusion of 92° C.

We claim:

1. A hard crystalline coating consisting of at least 90% of a polyol mixture consisting, on a dry basis, of about 20 to 50% mannitol or about 5 to 50% glucose 1-6 mannitol, the balance for 100% of the dry matter content of the mixture consisting essentially of a polyol selected from the group consisting of xylitol, maltitol and lactitol.

2. Hard crystalline coating according to claim 1, wherein the polyol mixture is more than 95% of the coating.

3. Hard crystalline coating according to claim 2, wherein the polyol mixture is more than 98% of the coating.

4. Hard crystalline coating according to claim 1, containing mannitol which is, on a dry basis, 20 to 40% of the dry matter content of he polyol mixture.

5. Hard crystalline coating according to claim 4, containing mannitol which is, on a dry basis, 22 to 35% of the dry matter content of the polyol mixture.

6. Hard crystalline coating according to claim 1, containing glucose 1-6 mannitol which is, on a dry basis, 10 to 40% of the dry matter content of the polyol mixture.

7. Hard crystalline coating according to claim 6, containing glucose 1-6 mannitol which is, on a dry basis, 15 to 35% of the dry matter content of the polyol mixture.

8. Hard crystalline coating according to claim 1, containing pure mannitol or glucose 1-6 mannitol crystals mixed with pure xylitol, maltitol or lactitol crystals.

9. Hard crystalline coating according to claim 1, comprising mannitol or glucose 1-6 mannitol co-crystallized with xylitol, maltitol or lactitol.

10. A coated product containing the hard crystalline coating of claim 1.

11. Coated product according to claim 10, characterized in that it is a chewing-gum.

12. Hard crystalline coating consisting of at least 90% of a polyol mixture consisting, on a dry basis, of about 20 to 50% mannitol, the balance for 100% of the dry matter content of the mixture consisting essentially of xylitol, wherein it has a melting point of between 75 and 89° C.

13. Hard crystalline coating according to claim 12, having a melting point of between 82 and 89° C.

14. Hard crystalline coating consisting of at least 90% of a polyol mixture consisting, on a dry basis, of about 5 to 50% glucose 1-6 mannitol, the balance for 100% of the dry matter content of the mixture consisting essentially of xylitol, wherein it has a melting point of between 60 and 80° C.

15. Hard crystalline coating according to claim 14, having a melting point of between 62 and 78° C.

16. Coated product containing the hard crystalline coating of claim 15.

17. Coated product containing the hard crystalline coating of claim 14.

18. Hard crystalline coating consisting of at least 90% of a polyol mixture consisting, on a dry basis, of about 20 to 50% mannitol, the balance for 100% of the dry matter content of the mixture consisting essentially of xylitol, wherein it has a heat of fusion between 130 and 180 J/g.

19. Hard crystalline coating according to claim 18, having a heat of fusion between 140 and 175 J/g.

20. Hard crystalline coating consisting of at least 90% of a polyol mixture consisting, on a dry basis, of about 5 to 50% glucose 1-6 mannitol, the balance to 100% of the dry matter content of the mixture consisting essentially of xylitol, wherein it has a heat of fusion between 130 and 180 J/g.

21. Hard crystalline coating according to claim 20, having a heat of fusion between 140 and 175 J/g.

22. Coated product containing the hard crystalline coating of claim 21.

23. Coated product containing the hard crystalline coating of claim 20.

24. Crystallizable liquid composition for the preparation of a hard crystalline coating consisting of at least 90% of a polyol mixture consisting, on a dry basis, of about 20 to 50% mannitol or about 5 to 50% glucose 1-6 mannitol, the balance for 100% of the dry matter content of the mixture consisting essentially of a polyol selected from the group consisting of xylitol, maltitol, and lactitol.

* * * * *